United States Patent [19]

Tsai

[11] Patent Number: 4,726,479
[45] Date of Patent: Feb. 23, 1988

[54] RETRACTABLE SIPPER DEVICE FOR A PORTABLE THERMOS BOTTLE

[76] Inventor: Shung-Der Tsai, 381, Hwang Hsing Rd., Kaohsiung, Taiwan

[21] Appl. No.: 938,897

[22] Filed: Dec. 8, 1986

[51] Int. Cl.$^4$ ............................................. B65D 47/06
[52] U.S. Cl. ..................................... 215/229; 222/530
[58] Field of Search ............... 215/229, 1 A; 222/530, 222/527

[56] References Cited

U.S. PATENT DOCUMENTS

| | | | |
|---|---|---|---|
| 2,432,132 | 12/1947 | Allen | 215/229 |
| 4,684,032 | 8/1987 | Tsai | 215/1 A |

FOREIGN PATENT DOCUMENTS

| | | | |
|---|---|---|---|
| 843934 | 7/1952 | Fed. Rep. of Germany | 222/530 |
| 1035210 | 4/1953 | France | 215/1 A |
| 1130524 | 10/1956 | France | 215/1 A |

Primary Examiner—Donald F. Norton
Attorney, Agent, or Firm—Armstrong, Nikaido, Marmelstein & Kubovcik

[57] ABSTRACT

This invention relates to a retractable sipper device for a portable thermos bottle comprising a cover body, a cover plate, a winder and a sipper. The cover body has an internal thread at the bottom for attachment to a thermos bottle case and consists of an upper compartment having a sipper opening in a side wall, and blocks, notches and slopes on the bottom. A winder which has a groove in the rim to accommodate the wound sipper, is fitted in the upper compartment. An arm with a depending projection slidable on the bottom of the upper compartment is pivoted to the winder. A spring is provided in a case with an adjusting lid. A nozzle and guard provided to the sipper can be pulled out for sipping water from the thermos bottle and retracted with the unwinding of the spring.

3 Claims, 6 Drawing Figures

RETRACTABLE SIPPER DEVICE FOR A PORTABLE THERMOS BOTTLE

BACKGROUND AND SUMMARY OF THE INVENTION

Thermos bottles have been widely used and have become one of the indoor and outdoor necessities, especially to hikers, longdistance drivers and outdoor workers. Recently, a new type of thermos bottle with a sipper has been made available and liked by many people. But since the sipper is fixed, the user must hold the thermos bottle when sipping. To eliminate this disadvantage, the inventor developed the retractable sipper device for a portable thermos bottle of this invention.

The object of this invention is to provide a retractable sipper device for a portable thermos bottle in which the sipper can be pulled out to such a length as may be required and with only one hand. This is specially convenient for a driver since it enables a driver to sip water from the bottle when driving.

Another object of this invention is to provide a retractable sipper device for a portable thermos bottle which is threaded to fit various thermos bottle cases.

Still another object of this invention is to provide a retractable sipper device for a portable thermos bottle which is made in such a way that the sipper can be pulled out, retracted and stopped as desired.

DETAILED DESCRIPTION OF THE PREFERRED EMBODIMENT

Figure 1:
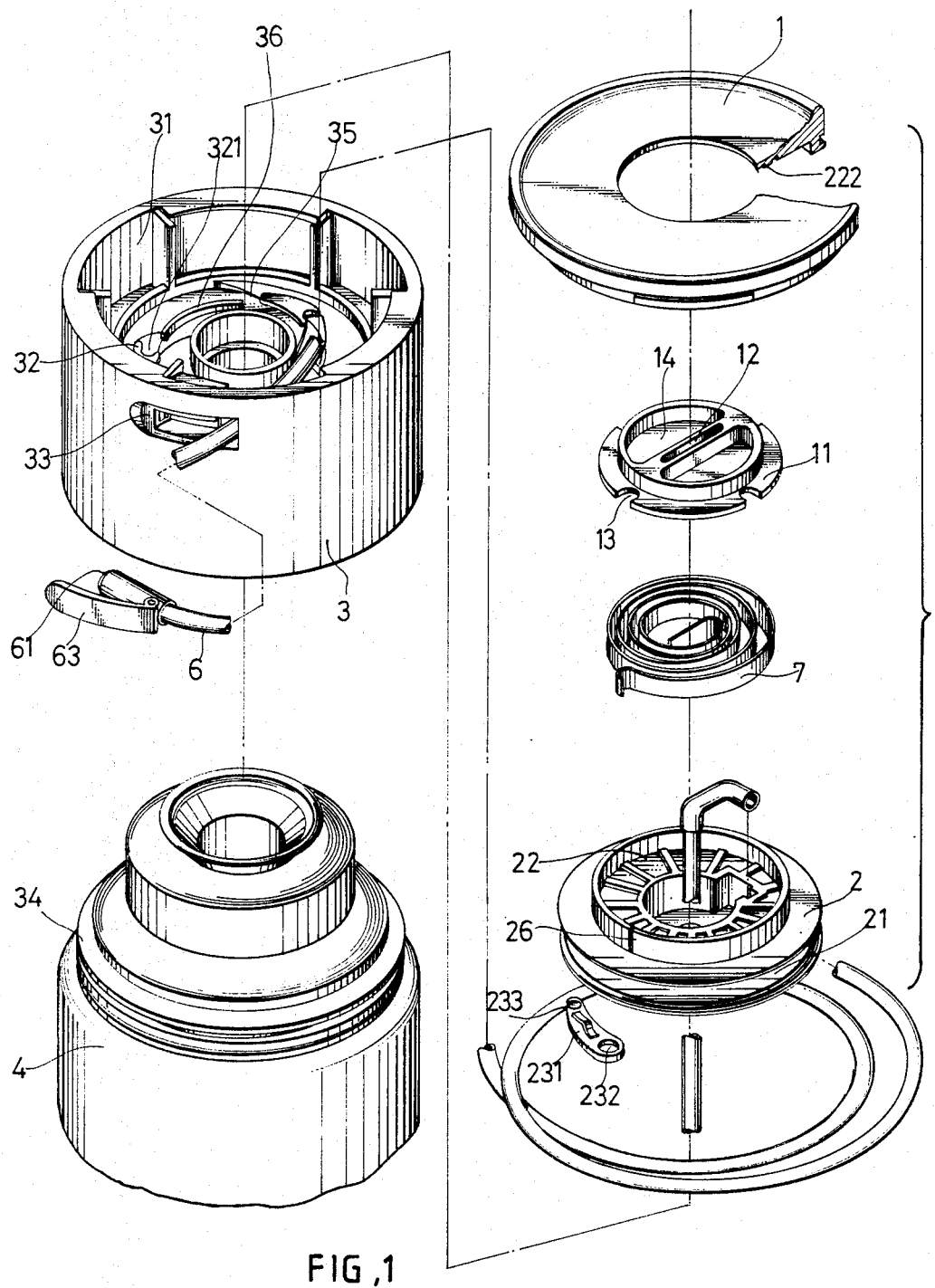
FIG. 1 is an exploded view of the retractable sipper device for a portable thermos bottle of this invention.
Figure 2:
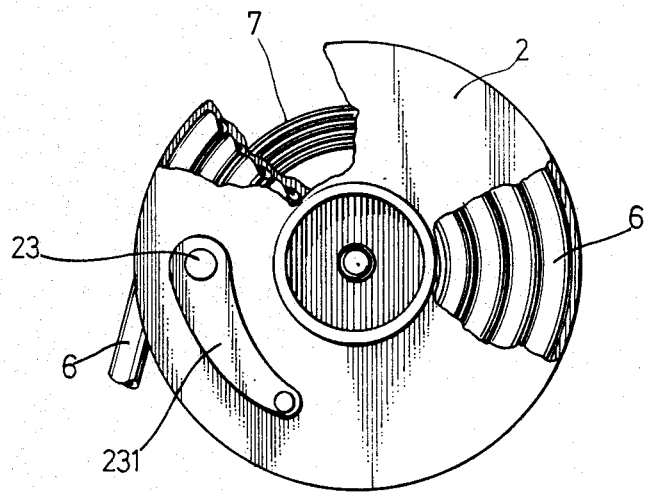
FIG. 2 is a bottom view of the winder of the sipper device of FIG. 1.

With reference to the drawings, the nature of the invention is described as follows:

As shown in FIG. 1 the retractable sipper device of this invention comprises a cover plate 1, a winder 2, a cover body 3 and a sipper 6. The cover body 3 has an internal thread 34 at the bottom for receiving the thread 41 of a thermos bottle case 4. The cover body 3 is made in two compartments. The upper compartment 31 has three blocks 32, notches 321 and slopes 35 on a bottom wall, and has a sipper opening 33 in the side wall. Two sipper holding clamps or seals 24 are provided at the bottom of the upper compartment 31 as shown by FIG. 2.

A winder 2 is fitted for rotation in the upper compartment 31. The winder has a deep groove 21 in a rim for accommodating the sipper 6 and a stud 23 fitting in a hole 232 of an arm 231. The arm 231 has a projection 233 which slides on the bottom wall of the upper compartment 31 and stops the winder when it falls in a notch 321 of one of the blocks 32.

The winder 2 has a spring case 22 on the top. The spring case 22 has a narrow aperture 26 for receiving one end of a spring 7 which snaps into the aperture 26 and is fixed thereto. The lid 11 of the spring case 22, to which the other end of the spring 7 is fixed, has four notches 13 at the rim for receiving projections 222 on the cover plate 1 to fix the lid 11 relative to the cover plate at 90° intervals. A circular projection is formed on the lid with two semicircular recesses 14 and a narrow recess 12 in the top and is used as a knob to wind or unwind the spring 7 with one's fingers or coin then it is necessary to adjust the sipper 6. Since the spring 7 is fixed to the spring case 22 of the winder 2, the spring 7 will be wound up with the turning or rotation of the winder 2 as the sipper 6 is pulled out, and unwound when the sipper 6 is released. The sipper 6 is made of flexible material to facilitate the winding.

Figure 3:
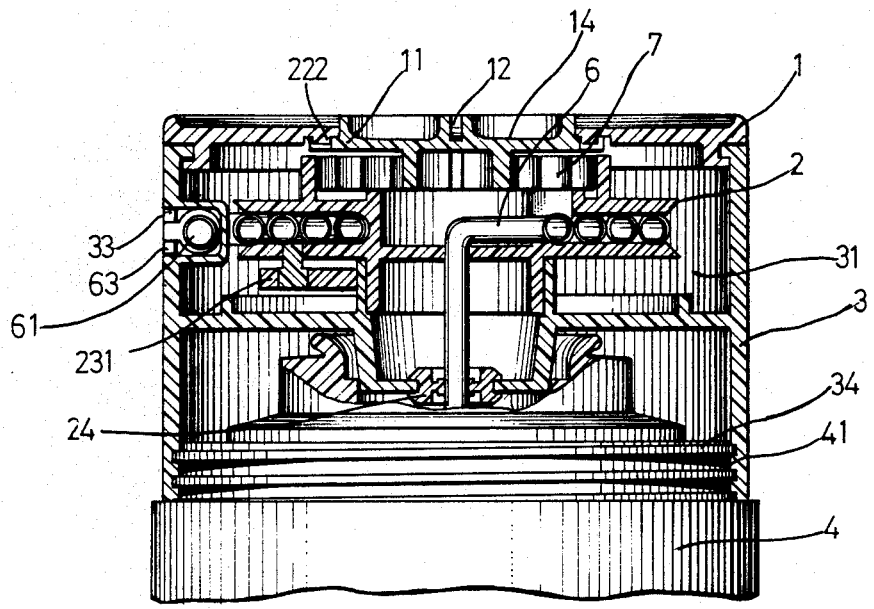
FIG. 3 is a longitudinal sectional view of the sipper device.
Figure 4:
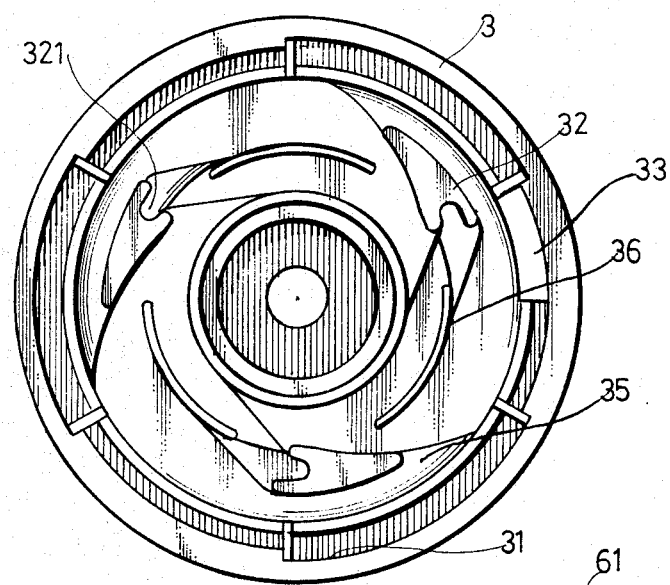
FIG. 4 is a top view of the cover body of the sipper device.
Figure 5:
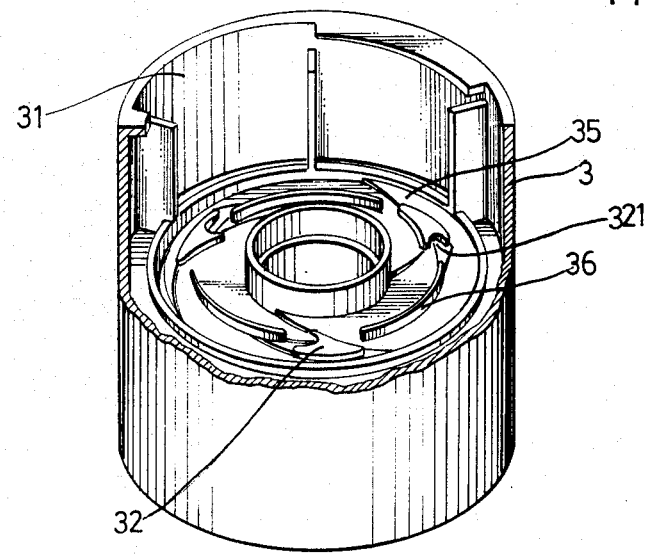
FIG. 5 is a perspective view partly in section of the cover body of the sipper device.

The internal thread 34 at the bottom of the cover body 3 as shown in FIG. 3 can be made in different sizes to match the thread of various thermos bottles. As shown by FIGS. 4 and 5, three slopes 35, three blocks 32 and three partitions 36 are provided on the bottom wall of the upper compartment 31 so that the projection 233 of the arm 231 can be pulled, regulated and stopped as desired. Since the arm 231 can move around the stud 23, the projection 233 at the end of the arm 231 will slide radially outside the partition 36 when the sipper 6 is pulled out. When the sipper is released and retracted by the winder 2 with the unwinding of the spring 7, the projection 233 at the end of the arm 231 of the winder 2 will be drawn back along the slope 35 and fall in a notch 321 of one of the blocks 32. But in case of longer sipper 6, that is, if the sipper is pulled out to a greater length, the spring will be wound tighter and, the projection 233 will remain sliding along the partition 36 for a longer period of time.

Figure 6:
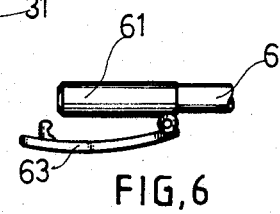
FIG. 6 illustrates a nozzle and guard for the sipper device.

As shown in FIG. 6 and FIG. 1, a nozzle guard 63 is provided at the connection of the sipper 6 and nozzle 61. The nozzle guard 63 is made in such a way that it will closely cover the sipper opening 33 when the sipper 6 is entirely retracted. In addition to keeping the nozzle 61 and sipper opening 33 clean, the nozzle guard 63 can be pried up and used as a handle for pulling out the sipper 6.

I claim:

1. A retractable sipper device for a portable thermos bottle comprising: a flexible sipper; a cover body having an internal thread at the bottom for receiving a thread of a thermos bottle case, an upper compartment having a sipper opening in a side wall thereof, and three sets of blocks, partitions and slopes formed on a bottom wall of said upper compartment, each said slope leading into a notch formed at one end of one of said blocks, said partitions and blocks being spaced from said side wall of said cover body; a cover plate having a circular aperture; a winder mounted for rotary movement in said upper compartment of said cover body and having a rim providing a groove for receiving and winding said flexible sipper, an arm with a projection on the bottom side mounted on said winder for sliding and radial movement relative to said bottom wall of said upper compartment, said projection passing through said space between said side wall of said cover body and said partitions and blocks in one direction of rotation and being adapted to fall into one of said notches when rotated in the other direction; and a spring case with an aperture in a wall thereof, a spring in said spring case and fixed at one end to said aperture of said spring case wall, and a lid, said lid having means fixing the other end of said spring and a circular projection received in said central aperture of said cover plate and serving as a knob for adjusting said spring, whereby said winder will be rotated to wind said spring as said flexible sipper is pulled out and said flexible sipper will be retracted and rewound on said winder upon release of said projection from one of said notches and unwinding of said spring.

2. A retractable sipper device for a portable thermos bottle according to claim 1 wherein said lid of said spring case has a plurality of equally spaced notches adapted to engage projections on said cover plate and a circular projection with recesses in the top serving as said knob for adjusting said spring.

3. A retractable sipper device for a portable thermos bottle according to claim 1 further including a nozzle guard closely covering said sipper opening in said cover body to prevent said flexible sipper from getting dirty when said sipper is retracted and rewound on said winder.

* * * * *